US009203904B2

(12) United States Patent
Maldaner

(10) Patent No.: US 9,203,904 B2
(45) Date of Patent: Dec. 1, 2015

(54) SECURE HYBRID FILE-SHARING SYSTEM

(71) Applicant: Citrix Systems, Inc., Fort Lauderdale, FL (US)

(72) Inventor: Juliano Maldaner, Cupertino, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 130 days.

(21) Appl. No.: 13/931,987

(22) Filed: Jun. 30, 2013

(65) Prior Publication Data
US 2015/0007264 A1    Jan. 1, 2015

(51) Int. Cl.
*H04L 29/08* (2006.01)
*G06F 21/62* (2013.01)
*H04L 29/06* (2006.01)

(52) U.S. Cl.
CPC ........ *H04L 67/1097* (2013.01); *G06F 21/6218* (2013.01); *H04L 63/107* (2013.01)

(58) Field of Classification Search
CPC ...... H04L 63/08; H04L 63/10; G06F 21/6218
USPC ........................ 726/2–4, 17, 21–22
See application file for complete search history.

(56) References Cited

U.S. PATENT DOCUMENTS

| | | | |
|---|---|---|---|
| 6,856,989 B1 * | 2/2005 | Zhou et al. | 1/1 |
| 7,676,835 B2 * | 3/2010 | Brannon et al. | 726/10 |
| 8,838,681 B2 * | 9/2014 | Motes et al. | 709/203 |
| 2010/0037324 A1 | 2/2010 | Grant et al. | |
| 2012/0151551 A1 | 6/2012 | Readshaw et al. | |
| 2012/0222110 A1 | 8/2012 | Huang et al. | |
| 2014/0096266 A1 * | 4/2014 | Hoard et al. | 726/28 |
| 2014/0171075 A1 * | 6/2014 | Teller | 455/435.1 |

* cited by examiner

*Primary Examiner* — Eleni Shiferaw
*Assistant Examiner* — Shaqueal Wade
(74) *Attorney, Agent, or Firm* — BainwoodHuang

(57) ABSTRACT

A method includes (1) receiving a request to share a file stored on a secure network with a target, the request identifying the file and the target, (2) performing a location operation to determine whether the target belongs to the secure network, (3) when a result of the location evaluation operation indicates that the target does not belong to the secure network, performing a sensitivity evaluation operation to determine whether the file identified by the request includes sensitive information, and (4) performing an access control operation, the access control operation (i) rejecting the request when both (a) the result of the location evaluation operation indicates that the target does not belong to the secure network, and (b) a result of the sensitivity evaluation operation indicates that the file includes sensitive information, and (ii) otherwise causing a link to access the file to be provided to the target.

12 Claims, 7 Drawing Sheets

SECURE HYBRID FILE-SHARING SYSTEM

BACKGROUND

Computer users often use various cloud services to distribute a document to others. For example, a user may upload the document to a cloud-based file depository and then provide a link to the document at that depository to another person. Some cloud-based file depositories allow users to select whether any person having the link is able to access the document or whether only certain authorized users are able to access the document. Thus, upon upload to the cloud-based file depository, a user may determine that certain documents intended for wide distribution be accessible by anyone having a link to the cloud-based file depository, while other documents that are not intended for wide distribution (e.g., documents that the user intends to work on himself from a remote computer) be accessible only to authorized users (e.g., the user himself).

SUMMARY

The above-described conventional approaches for disseminating documents suffer from deficiencies, particularly in the context of an enterprise Data Leak Prevention (DLP) system. Enterprises often employ DLP systems to internally-managed data in order to prevent leaks outside of the enterprise. However, there are often situations in which employees desire to disseminate data outside the context of the DLP systems, such as, for example, to work on a document at home or to send a document to a potential client. This is sometimes accomplished by an employee copying the document to a disk or flash drive and then uploading it to a cloud-based file depository. However, because the document is removed from DLP management before being disseminated, there is a risk that the employee may not properly protect the document from leakage to entities that the enterprise does not want to access the document. The fact that the document may be stored in the cloud leaves the document open to hackers since the cloud-based file depository is not located within the firewall of the enterprise. Furthermore, although an employee may designate certain documents stored on the cloud-based file depository as accessible only to authorized users, that designation only applies when the employee decides to do so. However, not all employees can be trusted to decide which documents require that degree of protection. Thus, there is a possibility that an employee may designate a sensitive document as accessible by anyone having a link to the cloud-based file depository even though the document contains sensitive information that the enterprise does not want widely disseminated.

Some DLP systems attempt to solve this problem by causing all files to be encrypted, requiring files to only be decrypted on-the-fly using digital rights management (DRM). However, these solutions introduce additional complexity by requiring client applications to be configured to enforce DRM requirements, which may be undesirable in many contexts.

Thus, it would be desirable to devise a system in which files are stored locally without need for encryption within a secure network (e.g., behind the enterprise firewall), while still allowing for access by authorized users. Thus, files may be shared within the enterprise without restriction (with access permitted to designated authenticated users), but before files may be shared outside the enterprise, they must be determined to be non-sensitive (e.g., not containing any secret or classified information) by policy. It would further be desirable for enterprise servers to easily be able to distinguish attempts to access files that have already been cleared for external access from attempts to access files that have not yet been cleared for external access without having to store large access tables.

Thus, embodiments are directed to techniques for controlling access to data by selectively permitting a file within a secure network to be shared with a recipient only if either the recipient belongs to the secure network or if the file is deemed to be non-sensitive. The techniques further involve sending a link to the recipient. In some embodiments the link is to an external cloud server. In some embodiments, the link is signed when the recipient is external to the secure network to ensure that only files that have been pre-screened for sensitivity may be shared outside the secure network without the need to store a list of such files, but the link is unsigned when the recipient is internal to the secure network, allowing the secure network to manage internal document sharing.

One embodiment is directed to a method of controlling access to data. The method includes (1) receiving, by processing circuitry, a request to share a file stored on a secure network with a target user, the request identifying the file and the target user, (2) performing, by the processing circuitry, a location operation to determine whether the target user belongs to the secure network, (3) when a result of the location evaluation operation indicates that the target user does not belong to the secure network, performing, by the processing circuitry, a sensitivity evaluation operation to determine whether the file identified by the request includes sensitive information, and (4) performing, by the processing circuitry, an access control operation, the access control operation (i) rejecting the request when both (a) the result of the location evaluation operation indicates that the target user does not belong to the secure network, and (b) a result of the sensitivity evaluation operation indicates that the file includes sensitive information, and (ii) otherwise causing a link to access the file to be provided to the target user. Other embodiments are directed to a computerized apparatus and a computer program product for performing a method similar to that described above.

Other embodiments are directed to a system for sharing a file. The system includes (A) a secure network, (B) a file server within the secure network, the file server storing the file, (C) a network share server within the secure network, (D) a web server within the secure network, and (E) a gateway server connecting the secure network to a public network. The network share server is configured to (1) receive a request from a sharing entity to share the file with a recipient, the sharing entity being located within the secure network, (2) reject the request when both (a) the recipient is external to the secure network and (b) the file is sensitive, and (3) otherwise (i) create a share identifier (shareID) to identify the file, and (ii) send a link-creation request to the web server, the link creation request including the shareID and an indication of whether the recipient is either (a) internal to the secure network or (b) external to the secure network. The web server is configured to (1) receive the link creation request from the network share server, (2) create a signature of the shareID using a secret key stored on the web server when the recipient is external to the secure network, (3) create a link to be used in accessing the file, (4) send the link as well as the signature, when created, to a cloud server on the public network, via the gateway server, the cloud server being configured to cause the link to be sent to the recipient.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to techniques for controlling access to data by selectively permitting a file within a secure network to be shared with a recipient only if either the recipient belongs to the secure network or if the file is deemed to be non-sensitive. The techniques further involve sending a link to the recipient. In some embodiments the link is to an external cloud server. In some embodiments, the link is signed when the recipient is external to the secure network to ensure that only files that have been pre-screened for sensitivity may be shared outside the secure network without the need to store a list of such files, but the link is unsigned when the recipient is internal to the secure network, allowing the secure network to manage internal document sharing.

Figure 1:
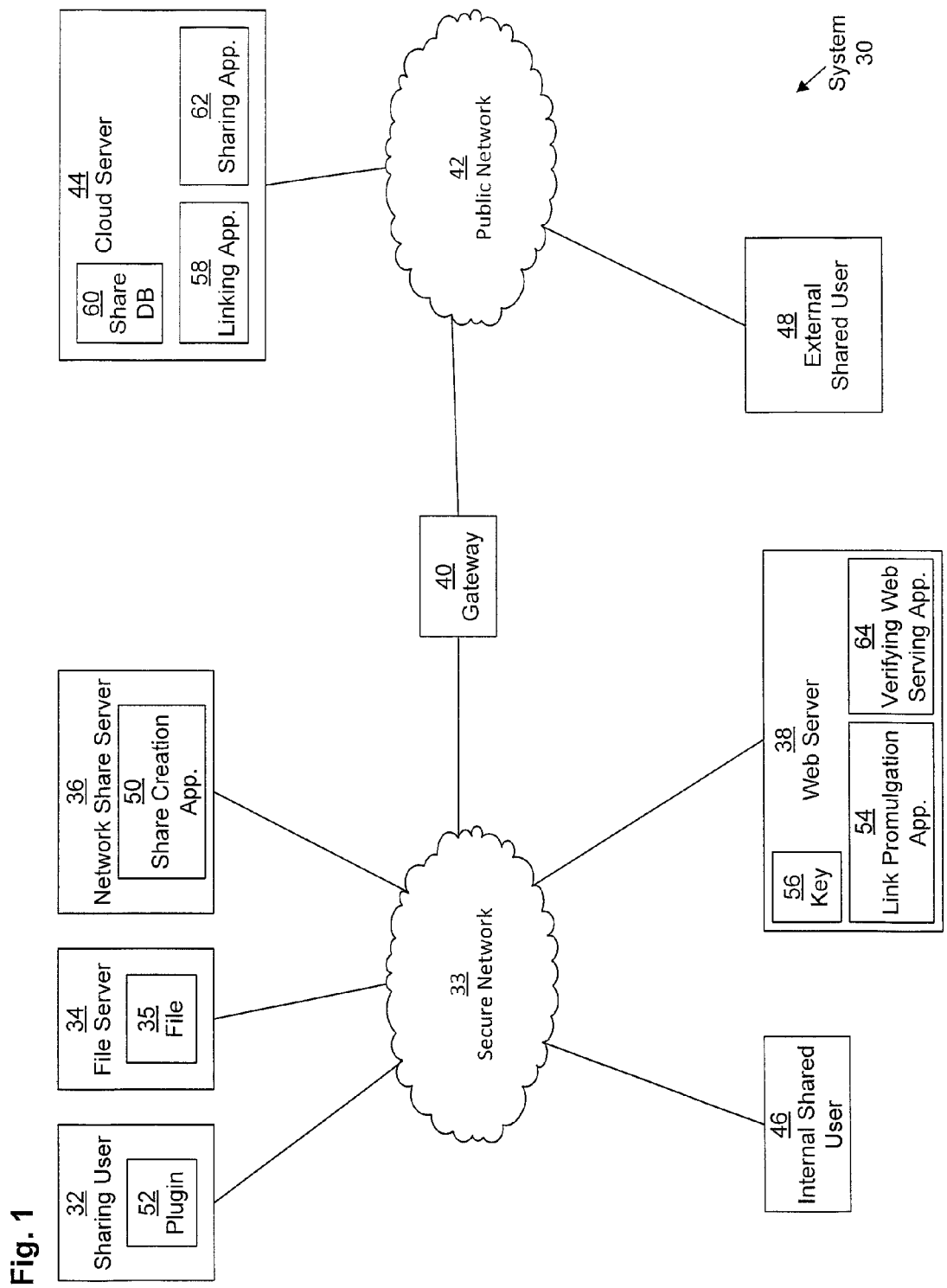
FIG. 1 depicts an example system for use in performing various embodiments.

FIG. 1 depicts an example system 30. System 30 includes a secure network 33, sharing user 32, a file server 34, a network share server 36, a gateway 40, and a web server 38. System 30 may further include an internal shared user 46.

Secure network 33 may be any kind of network, such as, for example, a local area network, a wide area network, a storage area network, a virtual private network, a fabric of interconnected hubs and switches, etc., or some combination thereof. Secure network 33 may be secured by having a firewall operate (e.g., on gateway 40) to prevent unauthorized access by machines and other entities outside of the secure network 32. All entities on secure network 33 may be required to authenticate prior to joining the secure network 33 and at various times while connected.

Sharing user 32 is an entity (e.g., a user having a user account configured to access the secure network 33 from a computing device connected to the secure network 33) belonging to the secure network 33 who wishes to share a file or a set of files (e.g., file 35 stored on file server 34) with a recipient (e.g., an internal shared user 46 who also belongs to the secure network 33 or an external shared user 48 who is external to the secure network 33). Sharing user 32 is able to set up a file share by interacting with network share server 36, as will be described below in further detail in connection with FIGS. 2-3 and 6). Network share server 36 is able to set up the file share by further interacting with web server 38. Web server 38 may be configured to communicate with external cloud server 44 (via gateway 40) in addition to network share server 36 in the file share setup process.

Gateway 40 is configured to bridge secure network 33 with an external public network 42 (e.g., the Internet). Cloud server 44 connects to the public network 42. External shared user 48 may also connect to public network 42. In some embodiments, public network 42, cloud server 44, and external shared user 48 may be considered to be part of the system 30, in a broad sense.

Typically, each of the file server 34, network share server 36, web server 38, and gateway 40 (as well as the machines on which the sharing user 32 and recipient internal shared user 46 operate) are all separate computing devices which may communicate via secure network 33. These entities may be any kind of computing devices such as, for example, a personal computer, a workstation, a server, an enterprise server, a laptop computer, a mobile computer, a smart phone, a tablet computer, etc. However, in some embodiments, the functionality of one or more of these entities 32, 34, 36, 48, 40, 46 may be combined to operate on a single shared computing device.

Share Creation Application 50 runs on network share server 36. The operation of Share Creation Application 50 will be described below in further detail in connection with FIGS. 2-3.

Link Promulgation Application 54 and Verifying Web Serving Application 64 run on web server 38. The operation of Link Promulgation Application 54 will be described below in further detail in connection with FIGS. 2-3. The operation of Verifying Web Serving Application 64 will be described below in further detail in connection with FIGS. 4-5. Web server 38 also stores a secret cryptographic key 56. Typically, key 56 is known only to web server 38. The use of key 56 will be described below in further detail in connection with FIGS. 3 and 5.

Linking Application 58 and Sharing Application 62 run on cloud server 44. The operation of Linking Application 58 will be described below in further detail in connection with FIGS. 2-3. The operation of Sharing Application 62 will be described below in further detail in connection with FIGS. 4-5. Cloud server 44 also stores a share database 60. The use of share database 60 will be described below in further detail in connection with FIGS. 2-5.

Figure 2:
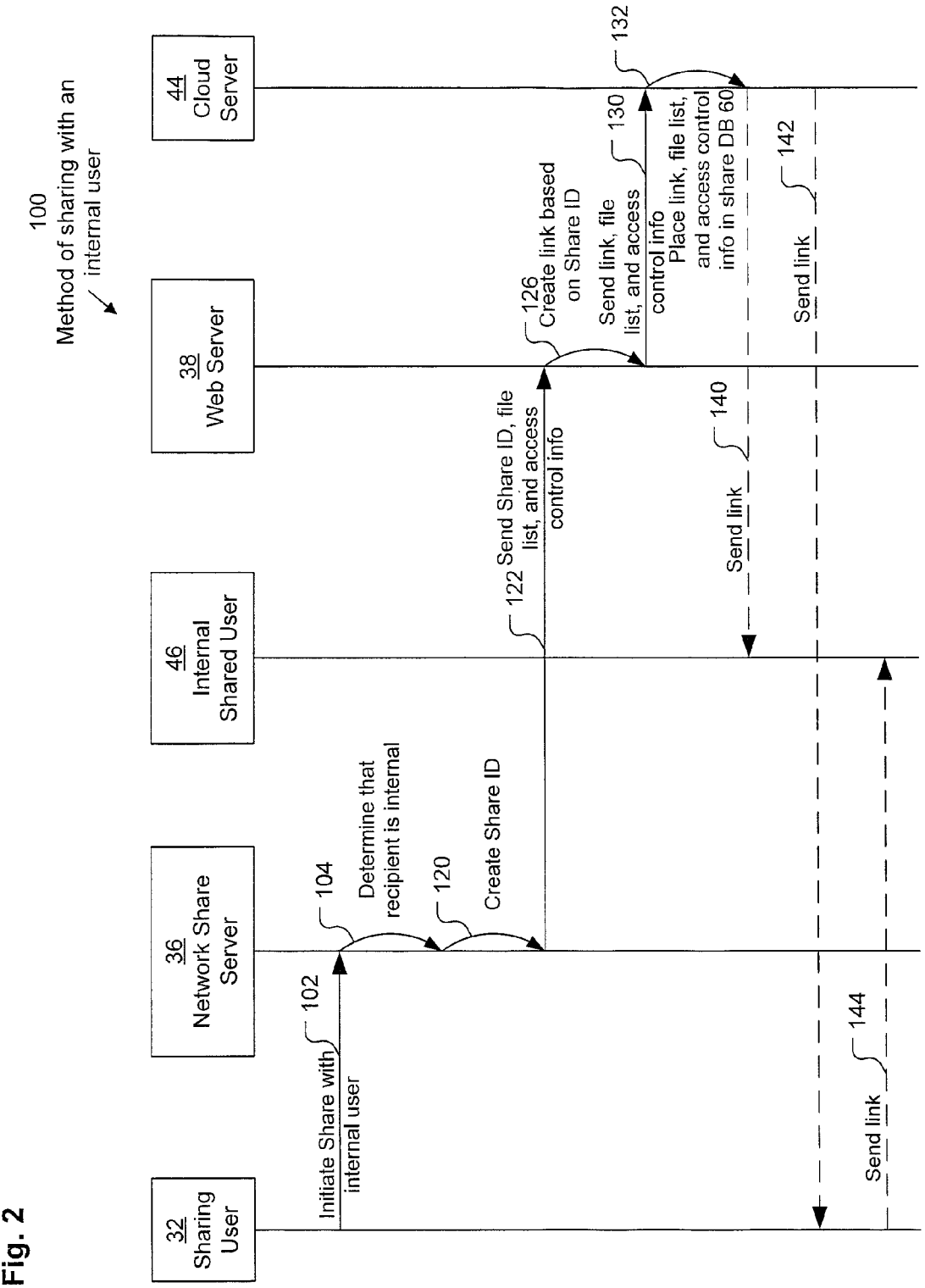
FIG. 2 depicts an example method according to various embodiments.

FIG. 2 illustrates, as method 100, the operation of system 30 in response to sharing user 32 attempting to share a file (or a set of files, hereinafter always referred to as file 35 rather than as a file or a set of files) with an internal shared user 46 as recipient. In step 102, sharing user 32 initiates a share operation in order to share file 35 stored within secure network 33 with an internal recipient (i.e., another use who also belongs to secure network 33), internal shared user 46, by sending a share request to network share server 36. Typically, the file 35 to be shared is stored on file server 34, although the file 35 may in fact be stored on the same machine as the sharing user 32 or on any other computing device within secure network 33. The share request may be explicitly sent by the sharing user 32, or, in some embodiments, Share Creation Application 50 running on network share server 36 may intercept an attempt to directly send the file 35 to the recipient 46 (e.g., as an attachment in an e-mail message), in which case Share Creation Application 50 prevents the file 35 from being sent and instead replaces the file 35 with a link (see below at step 144).

In some embodiments, a plugin application 52 running on the sharing user 32 machine may intercept an attempt to share the file 35 within, for example, an e-mail message, in which case the plugin 52 sends the share request to the network share server 36, and, one a link is generated, replaces the file 35 attachment with the link within the e-mail message. Plugin 52 may be, for example, an Outlook plugin configured to operate in conjunction with the Outlook e-mail application provided by the Microsoft Corp. of Redmond, Wash.

In step 104, Share Creation Application 50 determines that the recipient 46 is internal (i.e., belongs to the secure network 33) and then proceeds to step 120. If the share request identifies multiple recipients, then all recipients must be verified as internal, or else the Share Creation Application 50 will treat the recipient as being external (see the method of FIG. 3, below). In step 120, Share Creation Application 50 creates a share identifier (ShareID) and places the ShareID in an entry of the local share authorization DB 52 in association with the recipient 46. The ShareID represents the particular file share that the sharing user 32 is attempting to set up. The ShareID is a unique number created for this purpose. In some embodiments, the ShareID is randomly-generated, while, in other embodiments, the path of the file 35 may be predictably recreated using the ShareID. Even if the recipient 46 does not normally have access to the file due to file permissions, as long as the sharing user 32 has permission to access the file 35, the file share operation will permit the recipient 46 to be able to access the file 35 by referencing the ShareID.

In step 122, Share Creation Application 50 sends the ShareID to the web server 38 over secure network 33 for link creation together with an indication that the share is an internal share (e.g., that the recipient 46 belongs to the secure network 33).

In some embodiments, Share Creation Application 50 also sends additional information to the web server 38 at this time. For example, in embodiments in which the path of the file 35 may be predictably recreated using the ShareID, Share Creation Application 50 also sends the path of the file 35 (or list of files). In addition, if the recipient 46 us only allowed to access the file 35 by virtue of the share (i.e., the recipient does not have the proper file access permissions to access the file 35 directly), Share Creation Application 50 also sends access control information to allow the recipient 46 to access the file 35 when accessed through the share mechanism.

In step 126, upon receiving the ShareID and the indication that the share is internal from the network share server 36, Link Promulgation Application 54 running on web server 38 creates (step 126) a link based on the ShareID. Typically, the link points to cloud server 44. For example, the link may be of the form <http://www.CloudServer.com/AccessFile.js?FileID=ShareID>. Upon creating the link, in step 130, Link Promulgation Application 54 sends the link to cloud server 44 via gateway 40. In some embodiments, the link may instead be of the form <http://www.WebServer.com/AccessFile.js?FileID=ShareID>. In some embodiments, in addition to the link, Link Promulgation Application 54 also sends the additional information received from the Share Creation Application 50, such as the file path(s) and the access control information, together with the link.

In step 132, upon receiving the link from the web server 38, Linking Application 58 running on cloud server 44 places the link (and additional information) within an entry of share DB 60 as an index. In embodiments in which the link received from the Link Promulgation Application 54 is pointed towards the web server 38, Linking Application 58 may be configured to generate a modified link directed towards the cloud server 44 and use that modified link as the index, saving the received link within the entry to be used for redirection purposes. The entry indexed by the link may include various information useful to the cloud server 44, such as an address of the web server 38 and information about the current validity of the link (e.g., in case the link later expires). The entry may also include the file path(s) and/or access control information received from the Link Promulgation Application 54. In some embodiments, steps 130-132 may be skipped as there may be no need for the link to be stored on the cloud server 44 for an internal share; rather, in such embodiments, steps 140 or 142-144 are performed by the web server 38.

In step 140, Linking Application 58 (or, in embodiments in which the cloud server 44 is bypassed, Link Promulgation Application 54) sends the link to the recipient internal shared user 46 via secure network 33. In some embodiments, instead of step 140, in step 142, Linking Application 58 sends the link to the sharing user 32 so that the plugin 52 may operate to cause the link to be sent to the recipient 46 in step 144 within an e-mail message in place of the original attachment.

Figure 3:
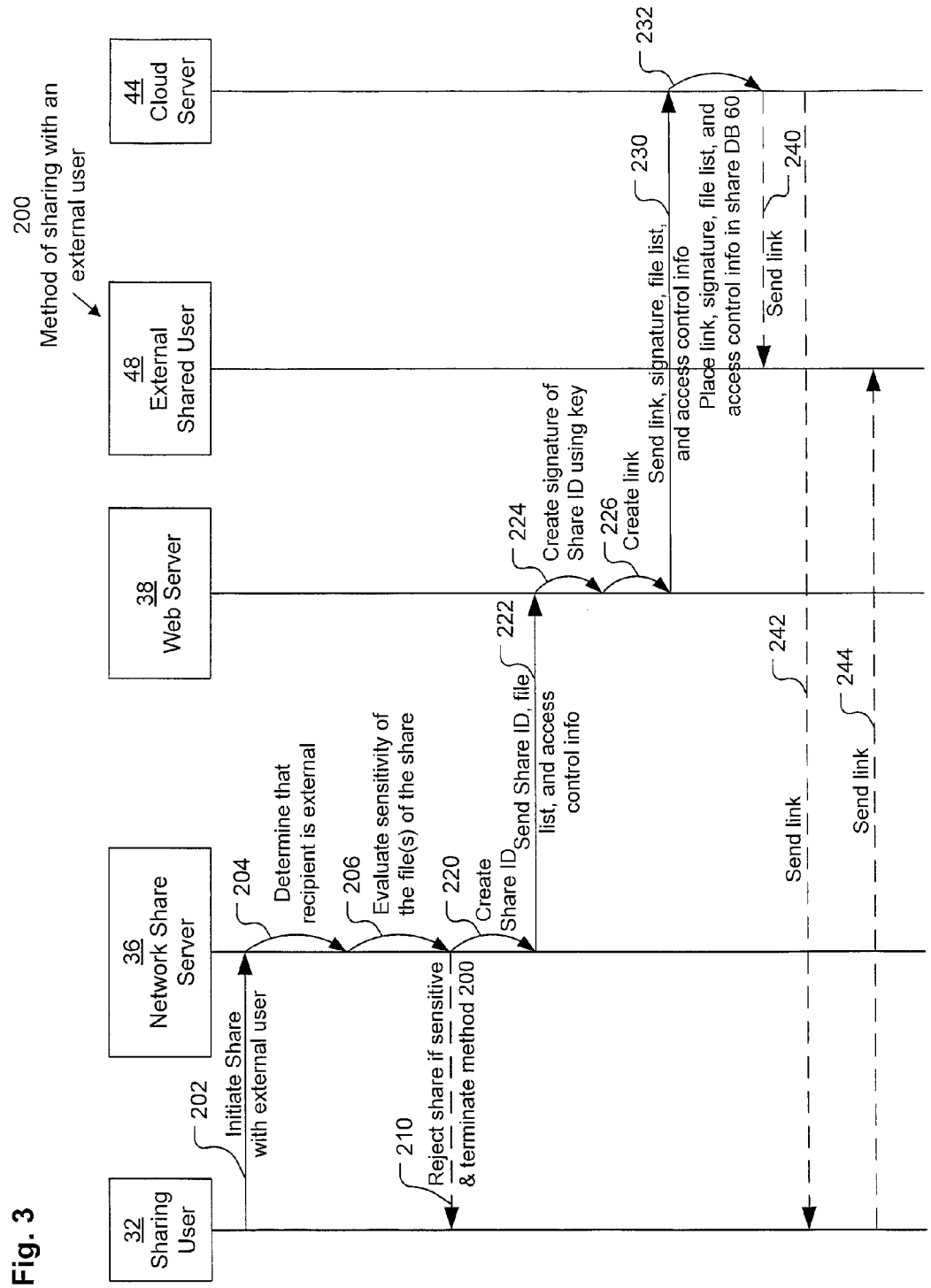
FIG. 3 depicts an example method according to various embodiments.

FIG. 3 illustrates, as method 200, the operation of system 30 in response to sharing user 32 attempting to share a file 35 with an external shared user 48 as recipient. In step 202, sharing user 32 initiates a share operation in order to share a file 35 stored within secure network 33 with an external recipient (i.e., another use who also belongs to secure network 33), external shared user 48, by sending a share request to network share server 36. Typically, the file 35 to be shared is stored on file server 34, although the file 35 may in fact be stored on the same machine as the sharing user 32 or on any other computing device within secure network 33. The share request may be explicitly sent by the sharing user 32, or, in some embodiments, Share Creation Application 50 running on network share server 36 may intercept an attempt to directly send the file 35 to the recipient 48 (e.g., as an attachment in an e-mail message), in which case Share Creation Application 50 prevents the file from being sent and instead replaces the file 35 with a link (see below at step 244), unless the share is forbidden (see below at step 210). In some embodiments, as described above, plugin application 52 running on the sharing user 32 machine may intercept the attempt to share the file 35 within, for example, an e-mail message, in which case the plugin 52 sends the share request to the network share server 36, and, one a link is generated, replaces the file 35 attachment with the link within the e-mail message.

In step 204, Share Creation Application 50 determines that the recipient 48 is external (i.e., does not belong to the secure network 33) and then proceeds to step 206. If the share request identifies multiple recipients, then if any recipient is external, Share Creation Application 50 will treat the recipient as being external.

In step 206, Share Creation Application 50 performs a sensitivity evaluation operation to determine whether the file 35 includes any sensitive information. In some embodiments, if the file 35 contains any sensitive (e.g., classified or secret) information, then operation proceeds to step 210, in which Share Creation Application 50 informs the sharing user 32 that the share request has been rejected, thereby terminating method 200. Otherwise, operation proceeds with step 220. In other embodiments, instructions about how to redact the sensitive information from the file 35 may be created, allowing operation to proceed with step 220. In yet other embodiments, a separate redacted version of the file 35 may be created in response to the determination of sensitivity, in which case, the file to be shared will actually be the redacted version rather than the original file 35.

In step 220, Share Creation Application 50 creates a ShareID. The ShareID represents the particular file share that the sharing user 32 is attempting to set up. The ShareID is a unique number created for this purpose. In some embodiments, the ShareID is randomly-generated, while, in other embodiments, the path of the file 35 may be predictably recreated using the ShareID.

In step 222, Share Creation Application 50 sends the ShareID to the web server 38 over secure network 33 for link creation together with an indication that the share is an external share (e.g., that the recipient 48 does not belong to the secure network 33).

In some embodiments, Share Creation Application 50 also sends additional information to the web server 38 at this time. For example, in embodiments in which the path of the file 35 may be predictably recreated using the ShareID, Share Creation Application 50 also sends the path of the file 35 (or list of files). In addition, if only certain external users are permitted to access the file 35, access control information may be sent as well. In addition, if there are redaction instructions, these may be included within the access control information sent to the web server 38.

In step 224, upon receiving the ShareID and the indication that the share is external from the network share server 36 (and the additional information), Link Promulgation Application 54 creates (step 224) a signature of the ShareID using the secret cryptographic key 56. For example, a cryptographic signing algorithm or a cryptographic hashing algorithm is used taking the ShareID and the secret cryptographic key 56 as inputs.

In step 226, Link Promulgation Application 54 creates a link based on the ShareID, and, in some embodiments, also the signature. Typically, the link points to cloud server 44. For example, the link may be of the form <http://www.CloudServer.com/AccessFile.js?FileID=ShareID> or of the form <http://www.CloudServer.com/AccessFile.js?FileID=ShareID&Signature=12345>. In some embodiments, instead of the signature being of the ShareID itself, the signature may be of the entire link absent the signature portion. Upon creating the link, in step 230, Link Promulgation Application 54 sends the link to cloud server 44 via gateway 40. In embodiments in which the link does not contain the signature, the Link Promulgation Application 54 also sends the signature to the cloud server 44 together with the link. In some embodiments, the link may instead be of the form <http://www.WebServer.com/AccessFile.js?FileID=ShareID&Signature=12345>. In some embodiments, in addition to the link (and signature), Link Promulgation Application 54 also sends the additional information received from the Share Creation Application 50, such as the file path(s) and the access control information, together with the link.

In step 232, upon receiving the link from the web server 38, Linking Application 58 places the link (and additional information) within an entry of share DB 60 as an index. In embodiments in which the link received from the Link Promulgation Application 54 is pointed towards the web server 38, Linking Application 58 may be configured to generate a modified link directed towards the cloud server 44 and use that modified link as the index, saving the received link within the entry to be used for redirection purposes. The entry indexed by the link may include various information useful to the cloud server 44, such as an address of the web server 38 and information about the current validity of the link (e.g., in case the link later expires). In embodiments in which the link does not contain the signature, the signature is also stored within the entry indexed by the link.

In some embodiments, steps 230-232 may be skipped as there may be no need for the link to be stored on the cloud server 44 if the link is of the form <http://www.WebServer.com/AccessFile.js?FileID=ShareID&Signature=12345> and no additional information is provided; rather, in such embodiments, steps 240 or 242-244 are performed by the web server 38.

In step 240, Linking Application 58 (or, in embodiments in which the cloud server 44 is bypassed, Link Promulgation Application 54) sends the link to the recipient external shared user 48. In some embodiments, instead of step 240, in step 242, Linking Application 58 sends the link to the sharing user 32 so that plugin 52 may operate to cause the link to be sent to the external recipient 48 in step 244 within an e-mail message in place of the original attachment.

Figure 4:
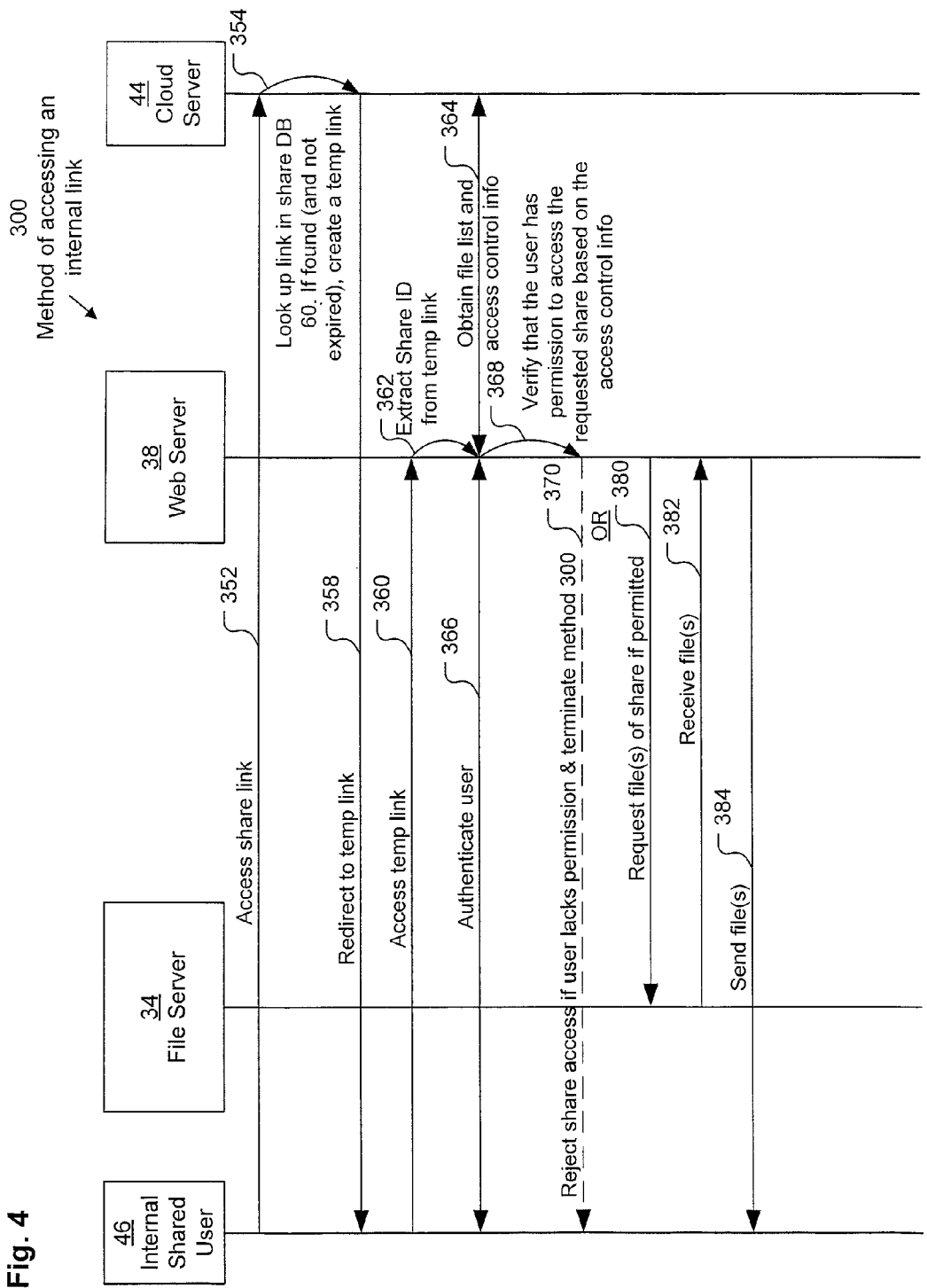
FIG. 4 depicts an example method according to various embodiments.

FIG. 4 illustrates, as method 300, the operation of system 30 in response to an internal shared user 46 attempting to access a file 35 for which an internal share has been set up. In step 352, internal shared user 46 sends a file sharing request by pointing his browser to the link (e.g., the link received in step 140 or 144) in order to access the file 35. As depicted, the link points to the cloud server 44. In some embodiments, the link may instead point to the web server 38, in which case operation may proceed directly to step 362.

In step 354, upon receiving the file sharing request from the internal shared user 46, Sharing Application 62 running on cloud server 44 looks up the link towards which the file sharing request was pointed within the share DB 60. If Sharing Application 62 finds an entry indexed by the link, then, after verifying that the link has not been canceled or expired (with reference to the current validity information stored within the entry), Sharing Application 62 creates a temporary link pointing to the web server 38. In some embodiments, the temporary link may be of the form <http://www.WebServer.com/AccessFile.js?FileID=ShareID>. In some embodiments, Sharing Application 62 extracts the ShareID from the link, obtains the address of the web server (and the application and format requirements, e.g., "/AccessFile.js?FileID=") from the entry, and appends the two together to create the temporary link such as just described. In embodiments in which the link received by the cloud server in step 130 was directed towards the web server 38 rather than the cloud server 44, Sharing Application 62 may be able to retrieve that link from the entry within the share DB 60 for use as part of the temporary link. In some embodiments, instead of simply appending the ShareID to the address of the web server, Sharing Application 62 cryptographically combines the ShareID (or, in some embodiments, the entire link) with the IP address or other identifying information of the internal shared user 46 (which is contained within the file sharing request) so that an eavesdropper is not able to use the same link to access the file. In other embodiments, Sharing Application 62 cryptographically combines the ShareID (or, in some embodiments, the entire link) with the current time or a counter value to prevent a replay attack by an eavesdropper. In some embodiments, Sharing Application 62 cryptographically combines the ShareID (or, in some embodiments, the entire link) with both the IP address of the internal shared user 46 and the current time. In any event, the cryptographic combination is typically performed using a public key of the web server 38 such that the web server 38 is able to decrypt the temporary link using its private key (which is separate from secret key 56). In step 358, Sharing Application 62 redirects the internal shared user 46 to the web server 38 by sending the temporary link to the internal shared user 46 within a redirect command.

In step 360, the internal shared user 46 sends a file sharing request to the web server 38 by pointing the browser to the temporary link to which it was redirected. It should be understood that in embodiments in which the cloud server 44 is not used and the link provided by the web server 38 in step 140 or 142 is of the form <http://www.WebServer.com/AccessFile.js?FileID=ShareID>, steps 352-358 are omitted, and, in step 360, the internal shared user 46 sends the file sharing request to the web server 38 directly from the beginning by pointing towards the link rather than a temporary link.

In step 362, upon receiving the file sharing request from the internal shared user 46, Verifying Web Serving Application 64 running on web server 38 extracts the ShareID from the temporary link (or the link). In step 364, Verifying Web Serving Application 64 may send the extracted ShareID to the cloud server 44 in order to obtain the file path(s) and the access control information stored within the share DB 60 in association with the shareID.

In step 366, which may be performed in parallel with step 364, Verifying Web Serving Application 64 running on web server 38 authenticates the internal shared user 46 in order to verify the true identity of that internal shared user 46. Upon authenticating the internal shared user 46 and receiving any file path(s) and access control information from the cloud server 44, Verifying Web Serving Application 64 verifies, in step 368, that the internal shared user 46 either has filesystem-based access to the file 35 or that the internal shared user 46 was permitted to access the file 35 by virtue of being the original target of the share request from step 102 (which fact is evidenced by reference to the access control information). If the internal shared user 46 is not permitted to access the file 35 on either basis, then, in step 370, Verifying Web Serving Application 64 rejects the file sharing request from the internal shared user 46 and method 300 is terminated. If, on the other hand, the internal shared user 46 is permitted to access the file 35 on either basis, then operation proceeds with step 380.

In step 380, Verifying Web Serving Application 64 requests the file 35 from the file server 34, receives the file 35 from the file server 34 in response (step 382), and sends the file 35 to the internal shared user 46 (step 384). In some embodiments, the network share server 36 performs steps 380-384 upon being directed to do so by web server 38 in response to a positive verification in step 368. In other embodiments, instead of steps 380-384 being performed by either the web server 38 or the network share server 36, the Verifying Web Serving Application 64 re-directs the internal shared user to the file server 34 to provide the file 35.

Figure 5:
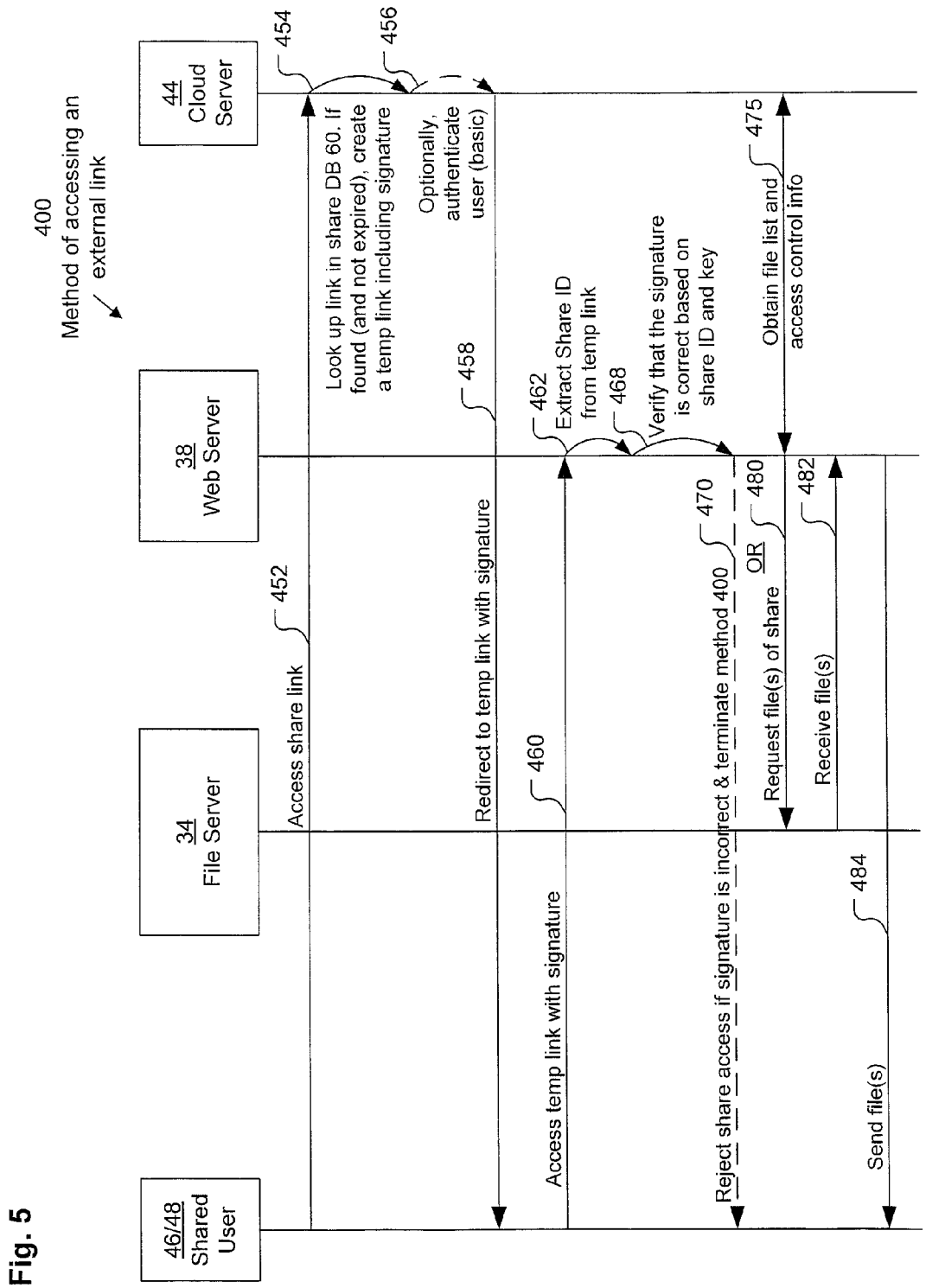
FIG. 5 depicts an example method according to various embodiments.

FIG. 5 illustrates, as method 400, the operation of system 30 in response to a shared user 46, 48 attempting to access a file 35 for which an external share has been set up. It should be understood that external shares may not only be accessed by an external shared user 48, but also by an internal shared user 46.

In step 452, the shared user 46, 48 sends a file sharing request by pointing his browser to the link (e.g., the link received in step 242 or 244) in order to access the file 35. As depicted, the link points to the cloud server 44. In some embodiments, the link may instead point to the web server 38, in which case operation may proceed directly to step 462.

In step 454, upon receiving the file sharing request from the shared user 46, 48, Sharing Application 62 running on cloud server 44 looks up the link towards which the file sharing request was pointed within the share DB 60. If Sharing Application 62 finds an entry indexed by the link, then, after verifying that the link has not been canceled or expired (with reference to the current validity information stored within the entry), Sharing Application 62 creates a temporary link, including the signature, pointing to the web server 38. In some embodiments, the temporary link may be of the form <http://www.WebServer.com/AccessFile.js?FileID=ShareID>, in which case the signature is sent separately to the shared user 46, 48. In other embodiments, the temporary link may be of the form <http://www.WebServer.com/AccessFile.js?FileID=ShareID&Signature=12345>. In some embodiments, Sharing Application 62 extracts the ShareID from the link, obtains the address of the web server (and the application and format requirements, e.g., "/AccessFile.js?FileID=") from the entry, and appends the two together to create the temporary link such as just described. In embodiments in which the link received by the cloud server in step 230 was directed towards the web server 38 rather than the cloud server 44, Sharing Application 62 may be able to retrieve that link from the entry within the share DB 60 for use as part of the temporary link. In embodiments in which the link includes the signature, Sharing Application 62 also extracts the ShareID from the link, while in embodiments in which the link does not include the signature, Sharing Application 62 obtains the signature from the entry. In some embodiments, instead of simply appending the ShareID (and signature) to the address of the web server, Sharing Application 62 cryptographically combines the ShareID (and signature) (or, in some embodiments, the entire link) with the IP address or other identifying information of the shared user 46, 48 (which is contained within the file sharing request) so that an eavesdropper is not able to use the same link to access the file. In other embodiments, Sharing Application 62 cryptographically combines the ShareID (and signature) (or, in some embodiments, the entire link) with the current time or a counter value to prevent a replay attack by an eavesdropper. In some embodiments, Sharing Application 62 cryptographically combines the ShareID (and signature) (or, in some embodiments, the entire link) with both the IP address of the internal shared user 46 and the current time. In any event, the cryptographic combination is typically performed using a public key of the web server 38 such that the web server 38 is able to decrypt the temporary link using its private key (which is separate from secret key 56).

In optional step 456, Sharing Application 62 performs a basic authentication of the shared user 46, 48. This basic authentication is basic in the sense that it is typically not as robust as an authentication performed within the secure network 33. Rather, the basic authentication may simply involve a username and password.

In step 458, Sharing Application 62 redirects the shared user 46, 48 to the web server 38 by sending the temporary link to the internal shared user 46 within a redirect command. In embodiments in which the temporary link does not include the signature, the signature is included within the redirect command separately from the temporary link, e.g., within HTTP POST information of the redirect command.

In step 460, the shared user 46, 48 sends a file sharing request to the web server 38 by pointing the browser to the temporary link to which it was redirected. It should be understood that in embodiments in which the cloud server 44 is not used and the link provided by the web server 38 in step 240 or 242 is of the form <http://www.WebServer.com/AccessFile.js?FileID=ShareID&Signature=12345>, steps 452-458 are omitted, and, in step 460, the shared user 46, 48 sends the file sharing request to the web server 38 directly from the beginning by pointing towards the link rather than a temporary link.

In step 462, upon receiving the file sharing request from the shared user 46, 48, Verifying Web Serving Application 64 running on web server 38 extracts the ShareID from the temporary link (or the link). In step 468, Verifying Web Serving Application 64 verifies, through a cryptographic procedure, that the signature is a true signature of the ShareID using secret key 56. If it is, then the Verifying Web Serving Application 64 can be sure that the ShareID is a valid external file share which Link Promulgation Application 54 had previously authorized (see step 224 in FIG. 3), so in step 480, Verifying Web Serving Application 64 requests the file 35 from the file server 34, receives the file 35 from the file server 34 in response (step 482), and sends the file 35 to the shared user 46, 48 (step 484). Otherwise, in step 470, Verifying Web Serving Application 64 rejects the file sharing request and terminates method 400 without sending the file 35 to the shared user 46, 48.

In embodiments in which the ShareID is randomly-generated, Verifying Web Serving Application 64 must contact the cloud server 44 in order to obtain the file path(s) before performing step 480. In some embodiments, instead of steps 480-484 being performed by the Verifying Web Serving Application 64 on the web server 38, these steps are performed by the network share server 36 upon being directed to do so by web server 38 in response to a positive verification in step 368.

In embodiments in which sensitive information may be redacted based on redaction instructions, Verifying Web Serving Application 64 may contact the cloud server 44 as part of step 475 in order to obtain any redaction instructions needed for the file 35 before performing step 480. In some embodiments, instead of steps 480-484 being performed by the Verifying Web Serving Application 64 on the web server, the network share server performs steps 480-484 after redacting the file 35.

Figure 6:
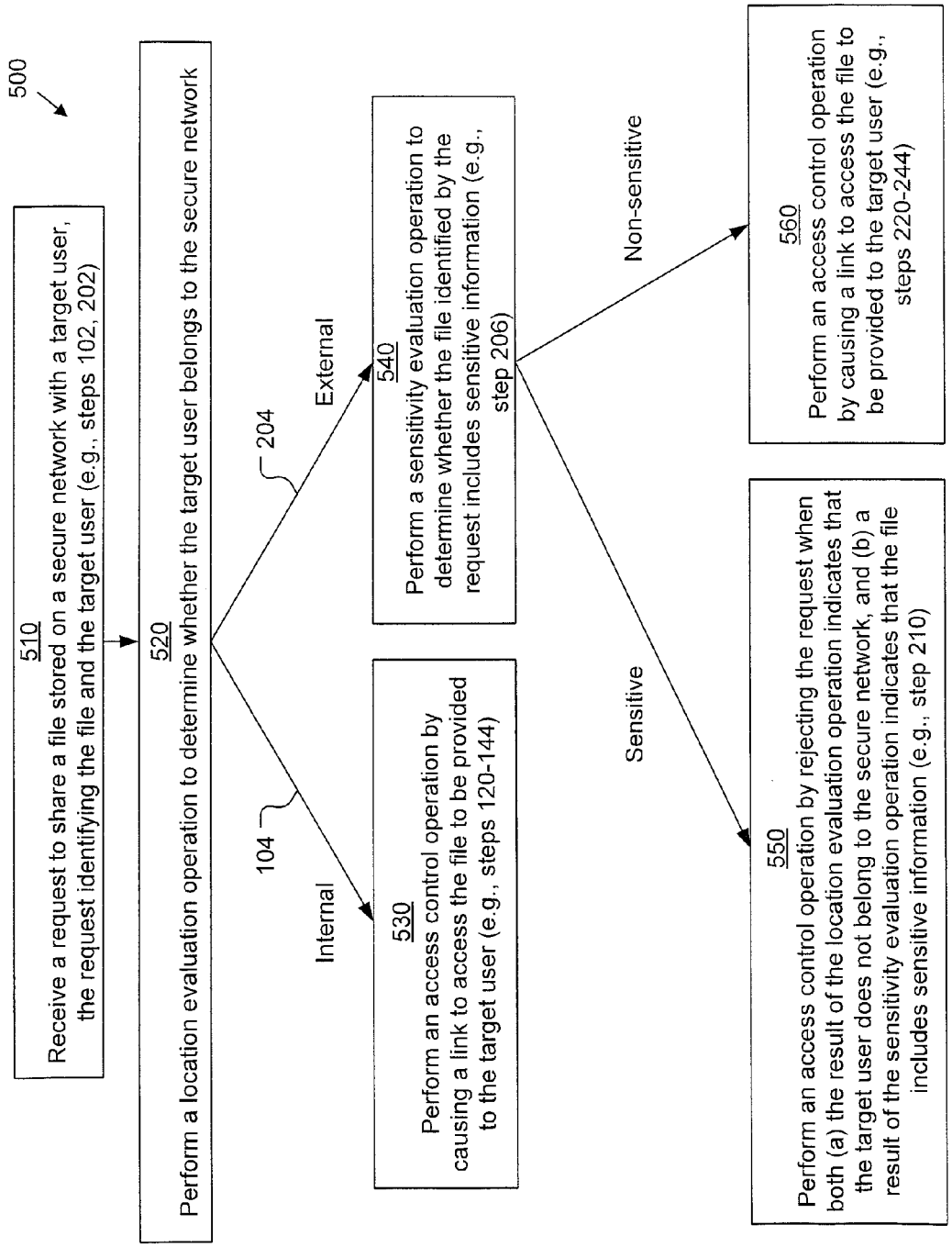
FIG. 6 depicts an example method according to various embodiments.

FIG. 6 depicts an example method 500 performed by processing circuitry within system 30. In some embodiments, the processing circuitry involved in method 500 may be located entirely within the network share server 36, while, in other embodiments, it may be distributed between various components. Method 500 involves setting up a file share, whether internal or external, encompassing material from parts of both method 100 and method 200 (see FIGS. 2-3).

In step 510, which encompasses both of steps 102 and 202 (see FIGS. 2-3), Share Creation Application 50 receives a request to share a file 35 stored on the secure network 33 with a target user 46, 48, the request identifying the file 35 and the target user 46, 48.

In step 520, Share Creation Application 50 performs a location evaluation operation to determine whether the target user 46, 48 belongs to the secure network 33. If the result of the location evaluation operation indicates that the target user 46 does belong to the secure network 33, then step 520 results in step 104 (see FIG. 2). If the result of the location evaluation operation indicates that the target user 48 does not belong to the secure network 33, then step 520 results in step 204 (see FIG. 3).

In step 530, which is performed when the result of the location evaluation operation indicates that the target user 46 does belong to the secure network 33, the processing circuitry performs an access control operation by causing a link to access the file 35 to be provided to the target user 46. For example, if the processing circuitry involved in method 500 is located entirely within the network share server 36, then it performs step 530 by performing steps 120-122 of method 100 (see FIG. 2) in order to cause the web server 38 and the cloud server 44 to perform steps 126-142), as described above. As an additional example, in embodiments in which the processing circuitry involved in method 500 is distributed between various components, then it performs step 530 by performing steps 120-144 of method 100 (see FIG. 2)), as described above.

In step 540, which is performed when the result of the location evaluation operation indicates that the target user 48 does not belong to the secure network 33, Share Creation Application 50 performs a sensitivity evaluation operation to determine whether the file 35 identified by the request includes sensitive information, as in step 206 of method 200 (see FIG. 3), as described above.

In step 550, which is performed when the result of the sensitivity evaluation operation indicates that the file 35 contains sensitive information, Share Creation Application 50 performs an access control operation by rejecting the request to share the file 35 when both (a) the result of the location evaluation operation indicates that the target user 48 does not belong to the secure network, and (b) a result of the sensitivity evaluation operation indicates that the file 35 includes sensitive information (see step 210 in FIG. 3). In some embodiments, as discussed above in connection with FIG. 3, instead of rejecting the request to share the file, the access control operation instead allows the file to be shared as in step 560, but with precautions taken to ensure that the file will be redacted.

In step 560, which is performed when the result of the sensitivity evaluation operation indicates that the file 35 does not contain sensitive information, the processing circuitry performs an access control operation by providing a link to access the file 35 to the target user 48. For example, if the processing circuitry involved in method 500 is located entirely within the network share server 36, then it performs step 560 by performing steps 220-222 of method 200 (see FIG. 3) in order to cause the web server 38 and the cloud server 44 to perform steps 224-242), as described above. As an additional example, in embodiments in which the processing circuitry involved in method 500 is distributed between various components, then it performs step 560 by performing steps 220-244 of method 200 (see FIG. 3), as described above.

Figure 7:
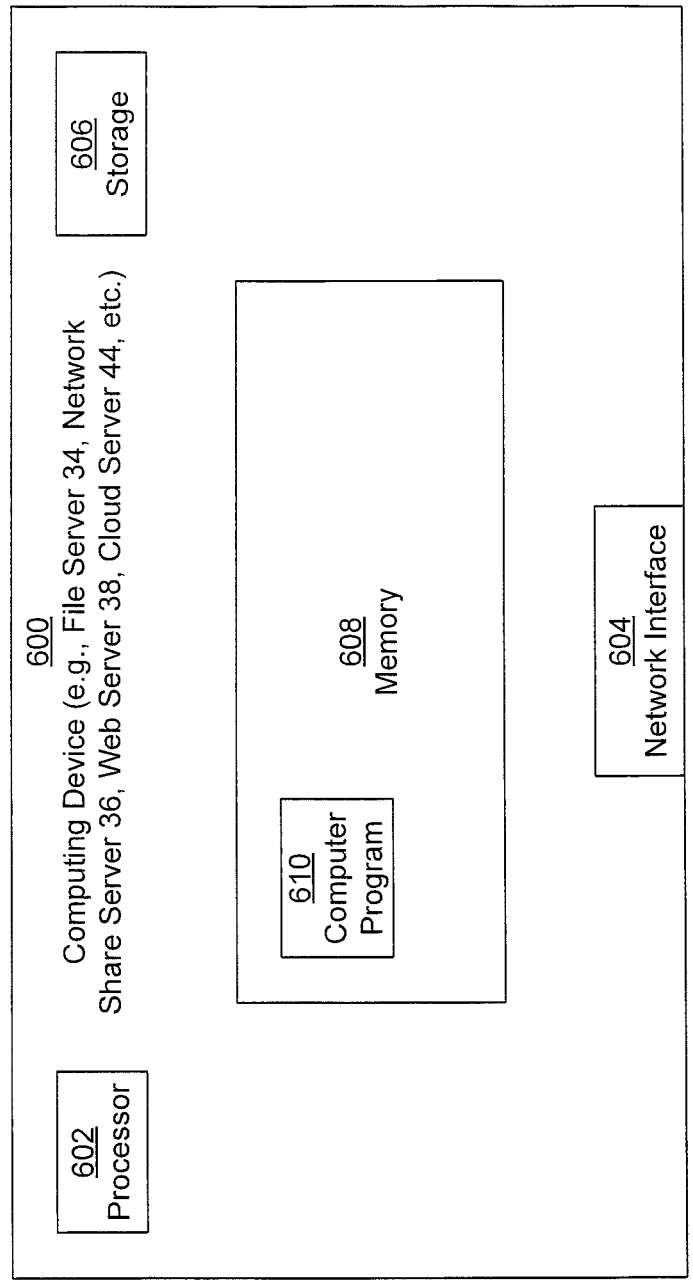
FIG. 7 depicts an example apparatus according to various embodiments.

FIG. 7 depicts an example computing device 600 in which a method as in FIGS. 2-6 may be performed. Computing device 600 may be any one of file server 34, network share server 36, web server 38, gateway 40, or cloud server 44. Computing device 600 may also be any one of the machines on which the sharing user 32 and recipient shared users 46, 48 operate. In some embodiments, several of these entities may be combined into a single computing device 600.

Computing device 600 includes a processor 602. Processor 602 may be any kind of processor or set of processors configured to perform operations, such as, for example, a microprocessor, a multi-core microprocessor, a digital signal processor, a collection of electronic circuits, or any combination of the above. Computing device 600 also includes a network interface 604 for interfacing with either secure network 33 or public network 42. In the case of gateway 40, two network interfaces 604 may be used to separately connect to secure network 33 and public network 42.

Computing device 600 may also include a data storage portion 606. Data storage portion 606 may include one or more persistent storage devices, such as, for example, an electromagnetic disk, an optical disk, a hard disk drive, a flash drive, a similar device, some combination of the above, etc. In the case of file server 34, data storage portion 34 stores a file 35 (or set of files) that the sharing user 32 wishes to share with recipient 46, 48.

Computing device 600 also includes memory 608. Memory 608 may be any kind of digital system memory, such as, for example, RAM. Memory 608 stores one or more computer programs 610 executing on processor 602 as well as data used by those programs 610. Memory 608 also stores an operating system (OS) (not depicted) and various applications and data.

In the case of the machine on which the sharing user 32 runs, memory 608 may store plugin 52 as computer program 610 while executing on processor 602. In some embodiments, the machine on which the sharing user 32 runs also stores the OS as well as plugin 52 within storage 606 even while the computing device 600 is powered off. The OS and plugin 52 are typically stored both in memory 608 and in persistent storage 606 so that they may be loaded into memory 608 from persistent storage 606 upon a system restart. Plugin 52, when stored in non-transient form either in memory 608 or in persistent storage 606, forms a computer program product. The processor 602 running the plugin 52 thus forms a specialized circuit constructed and arranged to carry out the various processes described herein.

In the case of network share server 36, memory 608 stores Share Creation Application 50 as computer program 610 while executing on processor 602. In some embodiments, network share server 36 also stores the OS as well as Share Creation Application 50 within storage 606 even while the computing device 600 is powered off. The OS and Share Creation Application 50 are typically stored both in memory 608 and in persistent storage 606 so that they may be loaded into memory 608 from persistent storage 606 upon a system restart. Share Creation Application 50, when stored in non-transient form either in memory 608 or in persistent storage 606, forms a computer program product. The processor 602 running the Share Creation Application 50 thus forms a specialized circuit constructed and arranged to carry out the various processes described herein.

In the case of web server 38, memory 608 stores Link Promulgation Application 54 and Verifying Web Serving Application 64 as computer programs 610 while executing on processor 602. Key 56 may be stored either in memory 608 or on storage 606 of the web server 38. In some embodiments, web server 38 also stores the OS as well as Link Promulgation Application 54 and Verifying Web Serving Application 64 within storage 606 even while the computing device 600 is powered off. The OS, Link Promulgation Application 54, and Verifying Web Serving Application 64 are typically stored both in memory 608 and in persistent storage 606 so that they may be loaded into memory 608 from persistent storage 606 upon a system restart. Link Promulgation Application 54, when stored in non-transient form either in memory 608 or in persistent storage 606, forms a computer program product. The processor 602 running the Link Promulgation Application 54 thus forms a specialized circuit constructed and arranged to carry out the various processes described herein. Verifying Web Serving Application 64, when stored in non-transient form either in memory 608 or in persistent storage 606, forms a computer program product. The processor 602 running the Verifying Web Serving Application 64 thus forms a specialized circuit constructed and arranged to carry out the various processes described herein.

In the case of cloud server 44, memory 608 stores Linking Application 58 and Sharing Application 62 as computer programs 610 while executing on processor 602. Share database 60 may be stored either in memory 608 or on storage 606 of the cloud server 44. In some embodiments, cloud server 44 also stores the OS as well as Linking Application 58 and Sharing Application 62 within storage 606 even while the computing device 600 is powered off. The OS, Linking Application 58, and Sharing Application 62 are typically stored both in memory 608 and in persistent storage 606 so that they may be loaded into memory 608 from persistent storage 606 upon a system restart. Linking Application 58, when stored in non-transient form either in memory 608 or in persistent storage 606, forms a computer program product. The processor 602 running the Linking Application 58 thus forms a specialized circuit constructed and arranged to carry out the various processes described herein. Sharing Application 62, when stored in non-transient form either in memory 608 or in persistent storage 606, forms a computer program product. The processor 602 running the Sharing Application 62 thus forms a specialized circuit constructed and arranged to carry out the various processes described herein.

It should be understood that any time a computer program 610, such as, for example, application 50, 52, 54, 58, 62, or 64, is described as performing a method, process, step, or function, in actuality what is meant is that a computing device (e.g., computing device 600) on which that piece of software 610 is running performs the method, process, step, or function when executing that piece of software 610 on its processor (e.g., processor 602). It should also be understood that, in some embodiments, instead of processor 602 executing code of the application, specialized circuitry of the computing device 600 operates to perform the method, process, step, or function directly in hardware.

Thus, techniques have been described for controlling access to data by selectively permitting a file 35 within a secure network 33 to be shared with a recipient 46, 48 only if either the recipient 46 belongs to the secure network 33 or if the file 35 is deemed to be non-sensitive. The techniques further involve sending a link to the recipient 46, 48. In some embodiments the link points to an external cloud server 44. In some embodiments, the link is signed when the recipient 48 is external to the secure network 33 to ensure that only files 35 that have been pre-screened for sensitivity may be shared outside the secure network 33 without the need to store a list of such files.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. §102, such determination being a legal determination that depends upon many factors, not all of which are known to Applicant at this time.

What is claimed is:

1. A method of controlling access to data, the method comprising:
   receiving, by processing circuitry, a request to share a file stored on a secure network with a target user, the request identifying the file and the target user;
   performing, by the processing circuitry, a location evaluation operation to determine whether the target user belongs to the secure network;
   when a result of the location evaluation operation indicates that the target user does not belong to the secure network, performing, by the processing circuitry, a sensitivity evaluation operation to determine whether the file identified by the request includes sensitive information; and performing, by the processing circuitry, an access control operation, the access control operation (i) rejecting the request when both (a) the result of the location evaluation operation indicates that the target user does not belong to the secure network, and (b) a result of the sensitivity evaluation operation indicates that the file includes sensitive information, and (ii) otherwise causing a link to access the file to be provided to the target user;

wherein:
performing the access control operation includes:
causing a message including the link to be sent to the target user through a public network when the result of the sensitivity evaluation operation indicates that the file does not includes sensitive information and the result of the location evaluation operation indicates that the target user does not belong to the secure network;
creating a share identifier (shareID), the shareID identifying the file; and
when the result of the sensitivity evaluation operation indicates that the file does not includes sensitive information and the result of the location evaluation operation indicates that the target user does not belong to the secure network, sending the shareID and an indication that the target user does not belong to the secure network to a web server within the secure network, the web server being configured to:
generate a signature of the shareID; and
cause the link to be sent to the target user;
the method further comprises:
receiving an access request to access the file from a file-seeking user, the access request including an access link, the access link encoding the shareID;
rejecting the access request when the access request does not include the signature of the shareID; and
otherwise, causing the file to be sent to the file-seeking user;
receiving the access request and rejecting the access request are performed by the web server in response to the file-seeking user being redirected to the web server after accessing the link at a cloud server on the public network; and
causing the file to be sent to the file-seeking user includes the web server performing the following operations:
retrieving the file from the secure network; and
sending the retrieved file to the file-seeking user.

2. The method of claim 1 wherein the cloud server is configured to:
in response to the file-seeking user accessing the link at the cloud server:
authenticate the file-seeking user; and
upon successfully authenticating the file-seeking user, generate the access link from the link, the access link pointing to the web server rather than the cloud server.

3. The method of claim 2 wherein generating the access link from the cloud link includes cryptographically combining the link with an address of the file-seeking user.

4. The method of claim 2 wherein generating the access link from the cloud link includes cryptographically combining the link with a current time, the access link remaining valid for a limited period of time.

5. The method of claim 1 wherein the method further comprises:
extracting the shareID from the access link; and
extracting the signature of the shareID from within HTTP POST data of the access request, the HTTP POST data having been placed within the access request by the cloud server.

6. A method of controlling access to data, the method comprising:
receiving, by processing circuitry, a request to share a file stored on a secure network with a target user, the request identifying the file and the target user;
performing, by the processing circuitry, a location evaluation operation to determine whether the target user belongs to the secure network;
when a result of the location evaluation operation indicates that the target user does not belong to the secure network, performing, by the processing circuitry, a sensitivity evaluation operation to determine whether the file identified by the request includes sensitive information; and
performing, by the processing circuitry, an access control operation, the access control operation (i) rejecting the request when both (a) the result of the location evaluation operation indicates that the target user does not belong to the secure network, and (b) a result of the sensitivity evaluation operation indicates that the file includes sensitive information, and (ii) otherwise causing a link to access the file to be provided to the target user;
wherein:
performing the access control operation includes:
causing a message including the link to be sent to the target user through a public network when the result of the sensitivity evaluation operation indicates that the file does not includes sensitive information and the result of the location evaluation operation indicates that the target user does not belong to the secure network;
creating a share identifier (shareID), the shareID identifying the file; and
when the result of the sensitivity evaluation operation indicates that the file does not includes sensitive information and the result of the location evaluation operation indicates that the target user does not belong to the secure network, sending the shareID and an indication that the target user does not belong to the secure network to a web server within the secure network, the web server being configured to:
generate a signature of the shareID; and
cause the link to be sent to the target user; and
the method further comprises:
receiving an access request to access the file from a file-seeking user, the access request including an access link, the access link encoding the shareID;
extracting the shareID from the access link;
extracting the signature of the shareID from the access link;
rejecting the access request when the access request does not include the signature of the shareID; and
otherwise, causing the file to be sent to the file-seeking user.

7. A method of controlling access to data, the method comprising:
receiving, by processing circuitry, a request to share a file stored on a secure network with a target user, the request identifying the file and the target user;

performing, by the processing circuitry, a location evaluation operation to determine whether the target user belongs to the secure network;

when a result of the location evaluation operation indicates that the target user does not belong to the secure network, performing, by the processing circuitry, a sensitivity evaluation operation to determine whether the file identified by the request includes sensitive information; and performing, by the processing circuitry, an access control operation, the access control operation (i) rejecting the request when both (a) the result of the location evaluation operation indicates that the target user does not belong to the secure network, and (b) a result of the sensitivity evaluation operation indicates that the file includes sensitive information, and (ii) otherwise causing a link to access the file to be provided to the target user;

wherein:
performing the access control operation includes:
causing a message including the link to be sent to the target user via the secure network when the result of the location evaluation operation indicates that the target user belongs to the secure network;
creating a share identifier (shareID), the shareID identifying the file; and
when the result of the location evaluation operation indicates that the target user belongs to the secure network, sending the shareID and an indication that the target user belongs to the secure network to a web server within the secure network, the web server being configured to cause the link to be sent to the target user; and the method further comprises:
receiving an access request to access the file from a file-seeking user, the access request including the shareID;

authenticating the identity of the file-seeking user;
rejecting the access request when the identity of the file-seeking user indicates that the file-seeking user does not belong to the secure network; and
otherwise:
rejecting the access request when the file-seeking user is not authorized to access the file; and
otherwise, causing the file to be sent to the file-seeking user.

8. The method of claim 7 wherein receiving the access request and authenticating the identity of the file-seeking user are performed by the web server in response to the fileseeking user being redirected to the web server after accessing the link at a cloud server on the public network.

9. The method of claim 8 wherein causing the file to be sent to the file-seeking user includes performing the following operations:
retrieving the file from the secure network; and
sending the retrieved file to the file-seeking user via the secure network.

10. The method of claim 8 wherein causing the file to be sent to the file-seeking user includes redirecting the user to a file server storing the file.

11. The method of claim 8 wherein the cloud server is configured to, in response to the file-seeking user accessing the link at the cloud server, generating the access link from the link, the access link pointing to the web server rather than the cloud server, by cryptographically combining the link with an address of the file-seeking user.

12. The method of claim 8 wherein the cloud server is configured to, in response to the file-seeking user accessing the link at the cloud server, generating the access link from the link, the access link pointing to the web server rather than the cloud server, by cryptographically combining the link with a current time, the access link remaining valid for a limited period of time.

* * * * *